May 5, 1936.   C. H. HOISINGTON ET AL   2,039,646
ECCENTRIC CUTTING ATTACHMENT FOR METAL WORKING SPINDLE MACHINES
Filed Aug. 22, 1934   3 Sheets—Sheet 2
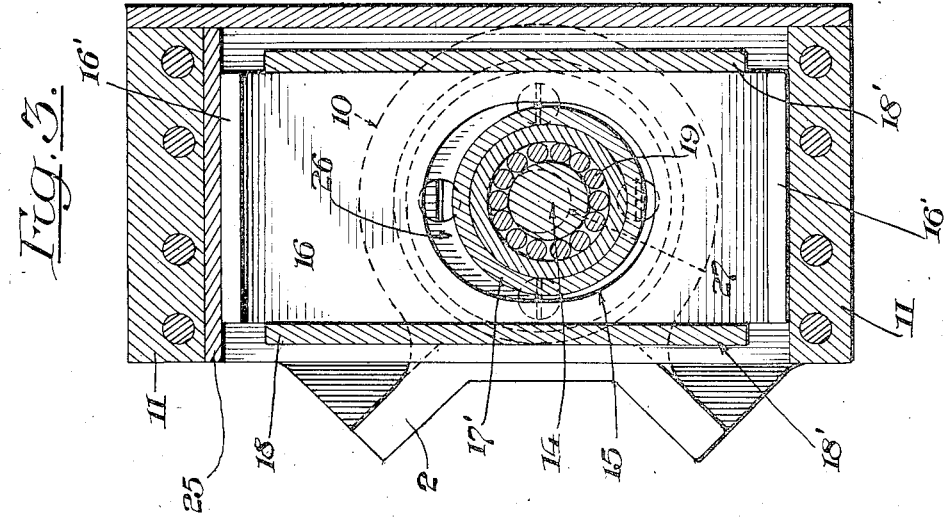
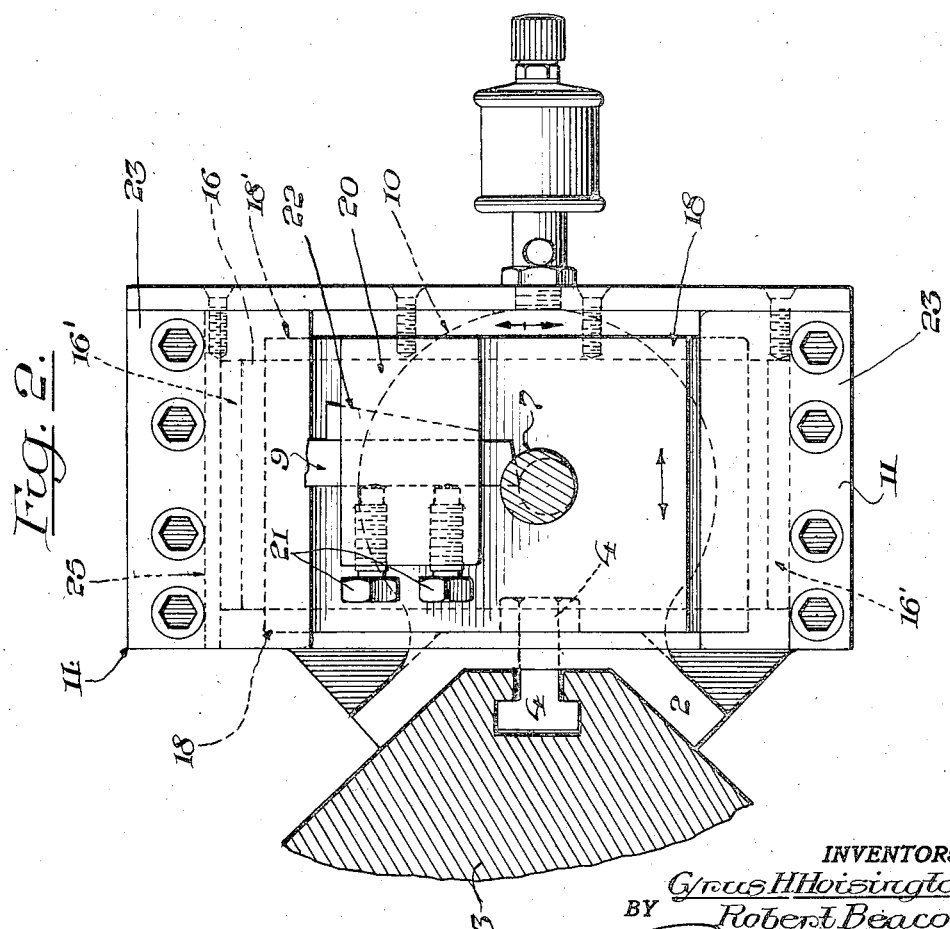
INVENTORS
Cyrus H Hoisington
BY Robert Beacom
ATTORNEY May 5, 1936.   C. H. HOISINGTON ET AL   2,039,646
ECCENTRIC CUTTING ATTACHMENT FOR METAL WORKING SPINDLE MACHINES
Filed Aug. 22, 1934   3 Sheets-Sheet 3
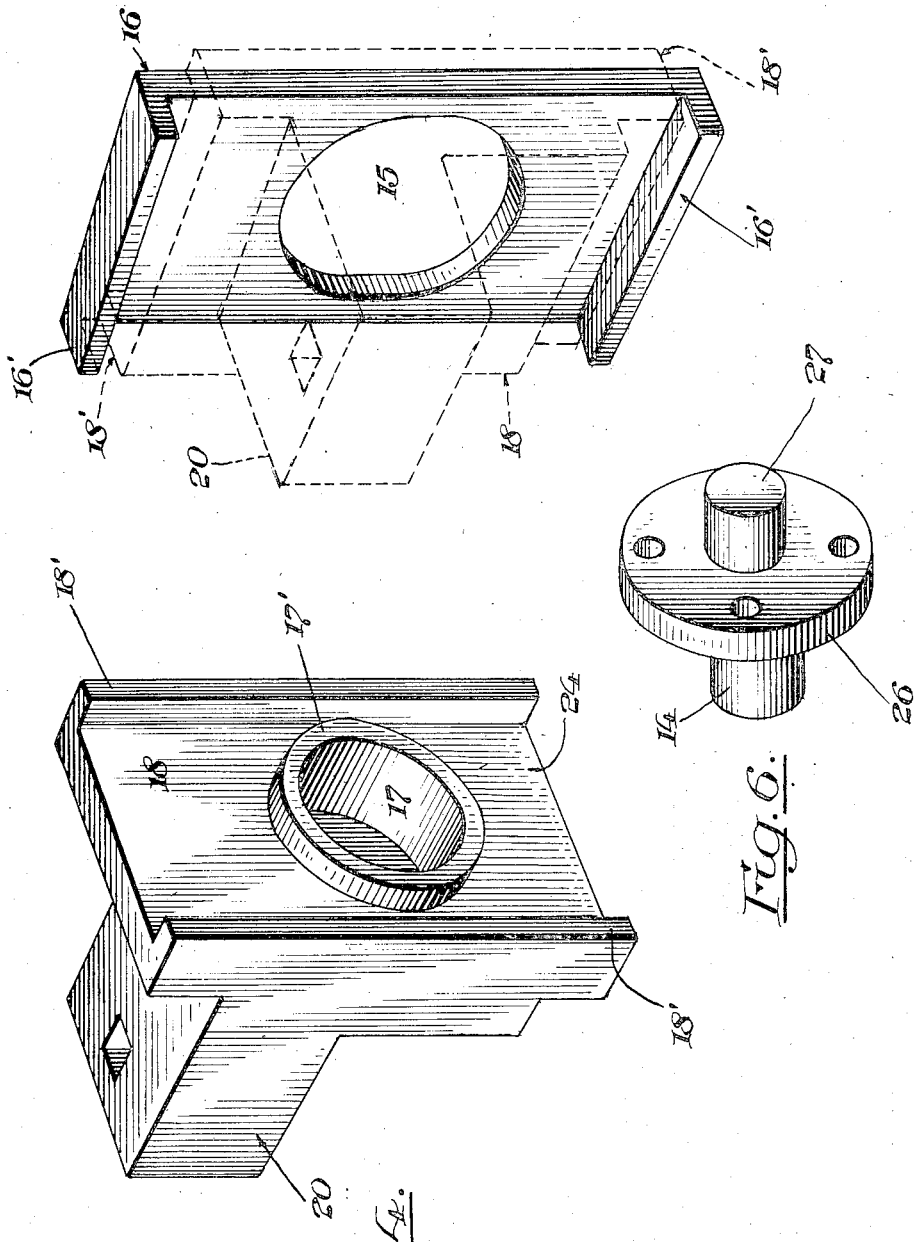
INVENTORS
Cyrus H. Hoisington
BY Robert Beacom
ATTORNEY Patented May 5, 1936

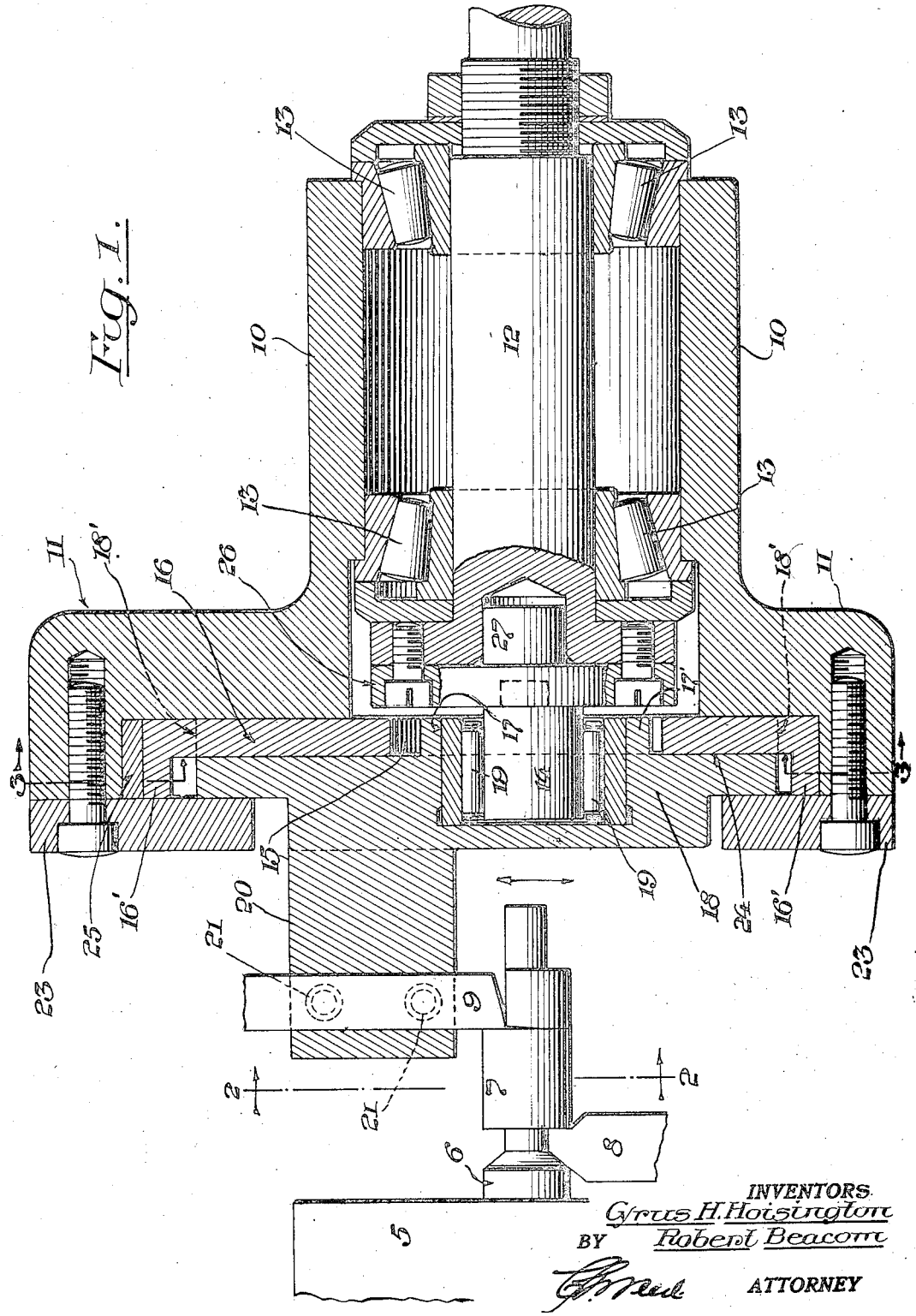

2,039,646

UNITED STATES PATENT OFFICE 2,039,646

ECCENTRIC CUTTING ATTACHMENT FOR METAL WORKING SPINDLE MACHINES

Cyrus H. Hoisington and Robert Beacom, Cleveland, Ohio, assignors to National Acme Company, Cleveland, Ohio, a corporation of Ohio Application August 22, 1934, Serial No. 740,865

20 Claims. (Cl. 29—57)

This invention relates to metal working machines and particularly to that type having a rotary work spindle or spindles and a sliding tool carrier, the object of the invention being to provide an improved fixture or attachment for, and method of turning an eccentric or offset diameter or diameters on stock or work, or boring or drilling an eccentric hole in stock or work, held concentrically in a rotating work spindle; or for turning a concentric diameter or diameters on stock or work, or boring or drilling a concentric hole in work or stock, held eccentrically in the work spindle, and by means of which the cutting tool is controlled on the center line of the work or stock at all times with the result that a perfect round bearing is obtained without any flat spots.

A further object of the invention is the provision of improved means for turning or boring eccentrically work that is held concentrically in the work spindle or vice versa which is simple in construction and by means of which the work will be performed more efficiently than heretofore and which attachment may be used with metal working machines of various forms and particularly with multiple spindle screw machines having an indexible work spindle carrier provided with rotatable work spindles and a sliding tool carrier, or with single spindle machines having a rotary work spindle and an indexible tool carrier.

The present improvement is designed for use with a multiple spindle screw machine such, for instance, as that shown and described in the contemporaneously pending application of C. W. Simpson and A. E. Drissner, Serial Number 632,490, filed September 10th, 1932, which machine has an indexible work spindle carrier carrying a series of rotary work spindles for the stock rods or bars fed therethrough and co-operating with which is a sliding tool carrier operated from the main cam shaft, which tool carrier supports a series of tools, the present fixture being adapted for attachment to that main tool slide.

In the drawings accompanying and forming a part of this specification, Fig. 1 is a longitudinal sectional view of this improved fixture or attachment in position to operate on a piece of work carried by the rotary work spindle of an indexible work spindle carrier.

Fig. 2 is a cross-sectional view taken on line 2—2 of Fig. 1.

Fig. 3 is a cross sectional view taken on line 3—3 of Fig. 1.

Figs. 4 and 5 are perspective views of the slides, and

Fig. 6 is a perspective view of the eccentric stud for operating the slides.

Similar characters of reference indicate corresponding parts in the several views.

Before explaining in detail the present improvement and mode of operation thereof, we desire to have it understood that the invention is not limited to the details of construction and arrangement of parts illustrated in the accompanying drawings since the invention is capable of other embodiments, and that the phraseology which we employ is for the purpose of description and not of limitation.

In the drawings the attachment is shown provided with a saddle 2 adapted to be bolted to the main tool slide 3 of the machine by suitable bolts 4 (see Fig. 2), and shifted back and forth by the usual cam shaft of the machine, while the indexible work spindle carrier also indexed from the cam shaft is illustrated at 5 (Fig. 1), carrying rotary work spindles 6, one being shown. The work or stock rod is designated as 7 and in this view this rod is being operated upon by the usual side cross slide tool 8 and also by a turning tool 9 carried by this improved attachment.

It will be understood that by changing the slide carrying the tool 9 so as to carry a boring bar or drill instead of a cutting or turning tool such as is shown, a boring or drilling operation may be performed in exactly the same way as the turning tool is operated.

Secured to the saddle 2 is a cylindrical or tubular head or support 10 having an enlarged flanged end 11. Supported within this tubular head 10 is a driving shaft 12 rotated from any suitable source of power, such as the main driving shaft of the machine, by means of suitable gearing, not shown. As the main driving shaft extends through the main tool slide and through the indexible work spindle carrier and by suitable gearing also rotates the work spindles at a predetermined speed, it follows that the shaft 12 and the work spindles will be rotated at the same speed and in the same direction.

The driving shaft 12 is supported within the cylindrical head 10 preferably by roller bearings 13 adjustably supported in position and is provided at its forward end with an eccentrically located driving stud 14 projecting through an elliptically formed opening 15 of a slide 16 and into a flanged opening 17 of a slide 18, suitable roller bearings 19 being located between this eccentric stud and the flange 17' of the opening 17 of the slide 18. This slide 18 has a forwardly projecting end 20 provided with a slot carrying the turning or cutting tool 9 which is suitably secured therein by means of set screws 21 and adjusted to cut on the center line of the work by a wedge 22 (see Fig. 2), or the slide may have provision for carrying a boring bar or drill as hereinbefore stated.

This slide 18 is held in the enlarged or flanged portion of the head by means of gibs 23 so as to permit it to freely slide horizontally as indicated by the arrows in Fig. 1. The rear of this slide 18 is provided with a milled recess 24 in which is fitted to slide vertically the slide 16 (see Fig. 5), as illustrated by the arrows in Fig. 2. This slide 16 is adjustable for wear by gibs 25. Into the elliptical opening 15 of this slide 16 the flange 17' of the slide 18 projects.

Thus it will be seen that the side flanges 18' of the slide 18 overlap the sides of the slide 16 while the flanges 16' formed at the opposite ends of the slide 16 overlap the top and bottom of the slide 18 thereby interlocking them for compound movement.

It will be observed that the eccentric stud 14 is provided with a flanged head 26 bolted to the enlarged end of the shaft 12, and this head 26 has a concentrically located stud 27 projecting into the end of the shaft 12 and that the shaft 12 and stud 27 are in alignment with the center line of the diameter of the work 7 carried by the work spindle. In other words, the axis of the shaft 12, its concentric stud 27 and the axis of the stock rod coincide.

The amount of eccentricity which the stud 14 has relative to the stud 27 and the shaft 12, corresponds to the amount of eccentricity to be given to the work and, therefore, by means of interchangeable eccentric studs, different eccentricities can be given to the work.

From the foregoing it will be observed that the rotation of the eccentric stud 14 by means of its driving shaft 12 tends to impart a circular motion to the slide 18 carrying the cutting tool 9 but since this slide cannot rotate because of the slide 16, the result is that it can only slide vertically and horizontally, that is, horizontally relative to the slide 16 by reason of the elliptical opening therein, and vertically therewith, this compound motion keeping the cutting edge of the tool on the center line of the work. Thus, the entire unit, which is a self-contained one, may be readily fastened to the tool or turret slide of the machine to travel forward and backward with that tool slide, the feed of which is determined by the tool slide operating cam mechanism.

By means of the present improvement, the tool always cuts on the center line of the work. In other words, the tool moves with the eccentric piece of work radially so that when the eccentric piece of work formed on a stock rod is carried either to the right or to the left of the center line of the stock rod during the rotation of that stock rod, the tool is similarly shifted and always cuts along the center line of that piece of work. Otherwise, the eccentric piece would be left with a flat place or spot. Thus, in the present improvement, the tool being set on the center line of the work when the work spindle rotates with the stock rod turning against the cutting face of the tool, the tool moves radially with the eccentric portion of the work being cut so that it is always in perfect alignment with the center of the piece and this result is obtained by reason of the rotating shaft in axial alignment with the work spindle and rotating at the same speed and in the same direction as the work spindle in combination with the co-operating slides which permit the tool to move in both vertical and horizontal directions.

It is to be understood that, by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A tool fixture or attachment for metal working machines comprising a housing, a rotary shaft carried by said housing, an eccentrically located stud carried by said shaft, a pair of co-operating slides supported by said housing and mounted on said stud for movement in horizontal and vertical planes, and a tool carried by one of said slides and operative on the center line of the work.

2. A tool fixture or attachment for metal working machines comprising a housing, a rotary shaft carried by said housing, an interchangeable eccentrically located stud carried by said shaft, a pair of co-operating slides supported by said housing and mounted on said stud for movement in horizontal and vertical planes, and a tool carried by one of said slides and operative on the center line of the work.

3. A tool fixture or attachment for metal working machines comprising a housing, a rotary shaft carried by said housing, an eccentrically located stud carried by said shaft, a pair of co-operating slides supported by said housing and mounted on said stud for movement in horizontal and vertical planes, and a tool carried by one of said slides and operative on the center line of the work, each of said slides having parts thereof overlapping the other and one of said slides having an elliptically formed opening for the reception of a part of the other slide.

4. A tool fixture or attachment for metal working machines comprising a housing, a rotary shaft carried by said housing, an eccentrically located stud carried by said shaft, a pair of co-operating slides supported by said housing and mounted on said stud for movement in horizontal and vertical planes, and a turning tool carried by one of said slides and operative on the center line of the work.

5. A tool fixture or attachment for use in a machine having one or more rotary work spindles and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in horizontal and vertical planes, and a tool carried by one of said slides and operative on the center line of the work.

6. A tool fixture or attachment for use in a machine having one or more rotary work spindles and a sliding tool carrier and comprising a housing secured to said tool carrier for reciprocation therewith, a rotary shaft carried by said housing and driven at the same speed and in the same direction as the work spindle, an interchangeable eccentrically located stud carried by said shaft, a pair of co-operating slides supported by said housing and mounted on said stud for movement in horizontal and vertical planes, and a tool carried by one of said slides and operative on the center line of the work.

7. A tool fixture or attachment for use in a machine having one or more rotary work spindles and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in horizontal and vertical planes, and a tool carried by one of said slides and operative on the center line of the work, each of said slides having parts thereof overlapping the other and one of said slides having an elliptically formed opening for the reception of a part of the other slide.

8. A tool fixture or attachment for metal working machines comprising a housing, a rotary shaft carried by said housing, an eccentrically located stud carried by said shaft, a pair of co-operating slides supported by said housing and mounted on said stud for movement in horizontal and vertical planes, a tool carried by one of said slides and operative on the center line of the work, each of said slides having parts thereof overlapping the other and one of said slides having an elliptically formed opening for the reception of a part of the other slide, and roller bearings between said last slide and the eccentric stud.

9. A tool fixture or attachment for use in a machine having one or more rotary work spindles and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in horizontal and vertical planes, a tool carried by one of said slides and operative on the center line of the work, each of said slides having parts thereof overlapping the other and one of said slides having an elliptically formed opening for the reception of a part of the other slide, and roller bearings between said last slide and the eccentric stud.

10. A tool fixture or attachment for use in a machine having one or more rotary spindles and a sliding tool carrier and comprising a cylindrical housing having an enlarged flanged head and secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in horizontal and vertical planes, one of said slides having side flanges overlapping the sides of the other slide and the latter having end flanges overlapping the ends of the first slide, said last slide having an elliptically formed opening for the reception of a part of the other slide, bearings located between said part and the eccentric stud, a tool carried by one of said slides, and means for adjustably locating it on the center line of the work.

11. A tool fixture or attachment for use in a machine having one or more rotary spindles and a sliding tool carrier and comprising a cylindrical housing having an enlarged flanged head and secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in horizontal and vertical planes, one of said slides having side flanges overlapping the sides of the other slide and the latter having end flanges overlapping the ends of the first slide, said last slide having an elliptically formed opening for the reception of a part of the other slide, bearings located between said part and the eccentric stud, a tool carried by one of said slides, means for adjustably locating it on the center line of the work, and adjustably supported bearings for supporting the shaft within the housing.

12. A tool fixture or attachment for metal working machines comprising a housing, a rotary shaft carried by said housing, an eccentrically located stud carried by said shaft, a pair of interlocking slides supported by said housing and mounted on said stud, one shiftable in a horizontal plane and the other in a vertical plane, and a tool carried by one of said slides and operative on the center line of the work.

13. A tool fixture or attachment for metal working machines comprising a housing, a rotary shaft carried by said housing, an eccentrically located stud carried by said shaft, a pair of interlocking slides supported by said housing and mounted on said stud, one shiftable in a horizontal plane and the other in a vertical plane, and a tool carried by the horizontally shiftable slide and operative on the center line of the work.

14. A tool fixture or attachment for metal working machines comprising a housing, a rotary shaft carried by said housing, an eccentrically located stud carried by said shaft, a pair of interlocking slides supported by said housing and mounted on said stud and shiftable in transverse planes, and a turning tool carried by one of said slides and operative on the center line of the work.

15. A tool fixture or attachment for use in a machine having one or more rotary work spindles for holding the work concentrically and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of interlocking slides supported by said housing and mounted on said stud, one for movement in a horizontal plane and the other in a vertical plane, and a tool carried by one of said slides and operative on the center line of the work.

16. A tool fixture or attachment for use in a machine having one or more rotary work spindles and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of interlocking slides supported by said housing and mounted on said stud, one for movement in a horizontal plane and the other in a vertical plane, and a turning tool carried by said horizontally shiftable slide and operative on the center line of the work.

17. A tool fixture or attachment for metal working machines comprising a housing, a rotary shaft carried by said housing, an eccentrically located stud carried by said shaft, a pair of co-operating slides supported by said housing and mounted on said stud for movement in transverse planes, and a tool carried by one of said slides and operative on the center line of the work.

18. A tool fixture or attachment for use in a machine having one or more rotary work spindles for holding the work concentrically and a sliding tool carrier and comprising a housing secured to said tool carrier for reciprocation therewith, a rotary shaft carried by said housing and driven at the same speed and in the same direction as the work spindle, an eccentrically located stud carried by said shaft, a pair of co-operating slides supported by said housing and mounted on said stud for movement in transverse planes, and a tool carried by one of said slides and operative on the center line of the work.

19. A tool fixture or attachment for metal working machines having a rotary work spindle and comprising a sliding tool carrier having a rotary shaft driven at the same speed and in the same direction as the work spindle, and means connecting the tool with the rotary shaft and effective to operate the tool so as to cut on the center line of the work during the formation of an eccentric piece and including means for effecting radial horizontal and vertical movement of the tool with the eccentric piece of work.

20. A tool fixture or attachment for metal working machines having a rotary work spindle and comprising a sliding tool carrier having a rotary shaft driven at the same speed and in the same direction as the work spindle, and means connecting the tool with the rotary shaft and effective to operate the tool so as to cut on the center line of the work during the formation of an eccentric piece and including means for effecting radial horizontal and vertical movement of the tool with the eccentric piece of work and comprising a pair of co-operating slides, one carrying the tool and an adjustable eccentric stud co-operating with the rotary shaft and said slides.

CYRUS H. HOISINGTON.
ROBERT BEACOM.